United States Patent [19]

Barkalow et al.

[11] Patent Number: 5,330,771
[45] Date of Patent: Jul. 19, 1994

[54] USE OF EUGENOL IN CHEWING GUM AS AN ANTIOXIDANT

[75] Inventors: David G. Barkalow, Deerfield; JaCara R. Muhammad, Chicago; Gordon N. McGrew, Evanston, all of Ill.

[73] Assignee: Wm. Wrigley Jr. Company, Chicago, Ill.

[21] Appl. No.: 968,277

[22] Filed: Oct. 29, 1992

[51] Int. Cl.$^5$ ............................................. A23G 3/30
[52] U.S. Cl. .................................... 426/3; 426/651; 426/541
[58] Field of Search ....................................... 426/3–6, 426/541, 651

[56] References Cited

U.S. PATENT DOCUMENTS 4,820,544  4/1989  Barcelon et al. ................... 426/660
4,948,595  8/1990  Patel et al. ............................ 426/3
4,978,686  12/1990 Sotome ................................ 514/698
5,139,796  8/1992  Barkalow et al. ..................... 426/3

FOREIGN PATENT DOCUMENTS 0464833    1/1992   European Pat. Off. ...... A23L 1/236
59-175422  10/1984  Japan ......................... A61K 31/045
62-034009  7/1987   Japan ............................ A61K 7/28

Primary Examiner—Jeanette Hunter
Attorney, Agent, or Firm—Willian Brinks Hofer Gilson & Lione

[57] ABSTRACT

An effective amount of eugenol exhibits very good antioxidant effects in mint oil and mint flavored chewing gum compositions, without altering the mint flavor. The stabilized mint oil and chewing gum compositions of the invention facilitate the replacement of synthetic antioxidants currently used in mint oil and mint-flavored chewing gums, with eugenol.

23 Claims, 4 Drawing Sheets

USE OF EUGENOL IN CHEWING GUM AS AN ANTIOXIDANT

RELATED APPLICATIONS

This application is a continuation-in-part of International application No. PCT/US92/06895, filed on Aug. 14, 1992, the entire disclosure of which is incorporated herein by reference.

FIELD OF THE INVENTION

The present invention relates to mint oil and mint flavored chewing gum compositions containing a minor quantity of eugenol which provides improved antioxidant effects.

BACKGROUND OF THE INVENTION

As is known in the art, chewing gum compositions include a number of ingredients, some of which are subject to deterioration through oxidation during storage. Mint oils are important ingredients of chewing gum which require stabilization, both before and after the mint oils are incorporated into the chewing gum. The term "mint oil" as used herein includes, but is not limited to, peppermint oil, spearmint oil, corn mint oil and Scotch spearmint oil. The use of peppermint oil in chewing gum, enhanced with a minor amount of spearmint oil, is discussed in U.S. Pat. No. 4,948,595 issued to Patel et al.

Several synthetic antioxidants are in widespread use for stabilizing mint oil and mint flavored chewing gum compositions. Among the most notable of these synthetic antioxidants are Butylated Hydroxy-anisole (BHA), Butylated Hydroxytoluene (BHT) and tertiary butyl hydroquinone (TBHQ). While BHA, BHT and TBHQ are effective in preventing and reducing oxidation of mint oil and mint flavored chewing gum compositions, there is nevertheless a demand for antioxidant systems which can be derived entirely from natural sources.

U.S. Pat. No. 5,139,796, issued to Barkalow et al., discloses that certain mixtures of tocopherol homologs, in certain ratios, exhibit improved antioxidant properties when used in chewing gum. Tocopherols are naturally occurring compounds which are FDA approved and which have been shown to be safe in animal testing. Expressed as percentage ranges of active ingredients (i.e. weight percentages based on total tocopherols), the preferred homolog ranges are 7–15% alpha tocopherol, 45–70% gamma tocopherol, and 20–35% delta tocopherol. Tenox GT-2 is a commercially available tocopherol blend whose homolog concentrations fall within these ranges. Tenox GT-2 contains about 10.2% alpha tocopherol, 61.6% gamma tocopherol, and 28.2% delta tocopherol (based on total tocopherols) is a soybean oil diluent (70% tocopherol mixture, 30% soybean oil). Tenox GT-2 is preferably employed in an amount sufficient to give an active tocopherol level of about 0.05–0.50% based on the weight of the mint oil.

The chewing gum industry is continuing to investigate other natural antioxidants which can stabilize mint oil, especially peppermint oil, and mint flavored chewing gums, without employing synthetic antioxidants.

SUMMARY OF THE INVENTION

It has been discovered that eugenol, when used in minor quantities, can serve as an effective antioxidant for mint oil without adversely affecting the mint flavor.

Eugenol is a naturally occurring substance which is found in cloves. Cloves are a well known spice whose oils have been commonly used in food products, including candy and even certain chewing gums, to contribute a spicy flavor to the products. U.S. Pat. No. 4,820,544, issued to Barcelon et al., discusses the composition of clove oil. As disclosed therein, clove bud oil typically contains in excess of 92% by weight eugenol. Clove leaf oil contains about 82–90% by weight eugenol, and clove stem oil contains about 87–96% eugenol.

The present invention contemplates the use, as an antioxidant, of either eugenol or an effective amount of a eugenol-containing substance, such as clove oil. By "effective amount", it is meant that the level of active eugenol should be about 0.2 to about 0.7 percent based on the weight of the mint oil. At levels of 0.8 percent or higher, the eugenol may still serve as an effective antioxidant but may change the flavor of the mint oil so that it is no longer a true mint flavor. At levels below about 0.2 percent, the eugenol will not sufficiently stabilize the mint oil.

The present invention is also directed to a mint-flavored chewing gum which includes about 0.5 to about 3.0 weight percent mint oil which is stabilized with eugenol, and which is substantially free of synthetic antioxidants. The eugenol can be preblended with the mint oil before the mint oil is added to the chewing gum. Alternatively, the eugenol can be added directly to the chewing gum.

With the foregoing in mind, it is a feature and advantage of the invention to provide a stabilizer system for mint oil and mint-flavored chewing gum, which includes eugenol and which does not contain synthetic antioxidants.

It is also a feature and advantage of the invention to provide stabilized mint oil compositions for use in chewing gum, particularly peppermint oil compositions, which do not utilize BHA, BHT, TBHQ, or other synthetic antioxidants.

It is also a feature and advantage of the invention to provide mint-flavored chewing gum compositions containing mint oil stabilized with eugenol, which are substantially free of synthetic antioxidants.

These and other features and advantages of the invention will become further apparent from the following detailed description of the presently preferred embodiments, when read in conjunction with the examples and drawings. The detailed description, examples and drawings are intended to be illustrative rather than limitative, the scope of the invention being defined by the appended claims and equivalents thereof.

DETAILED DESCRIPTION OF THE PRESENTLY PREFERRED EMBODIMENTS

Figure 1:
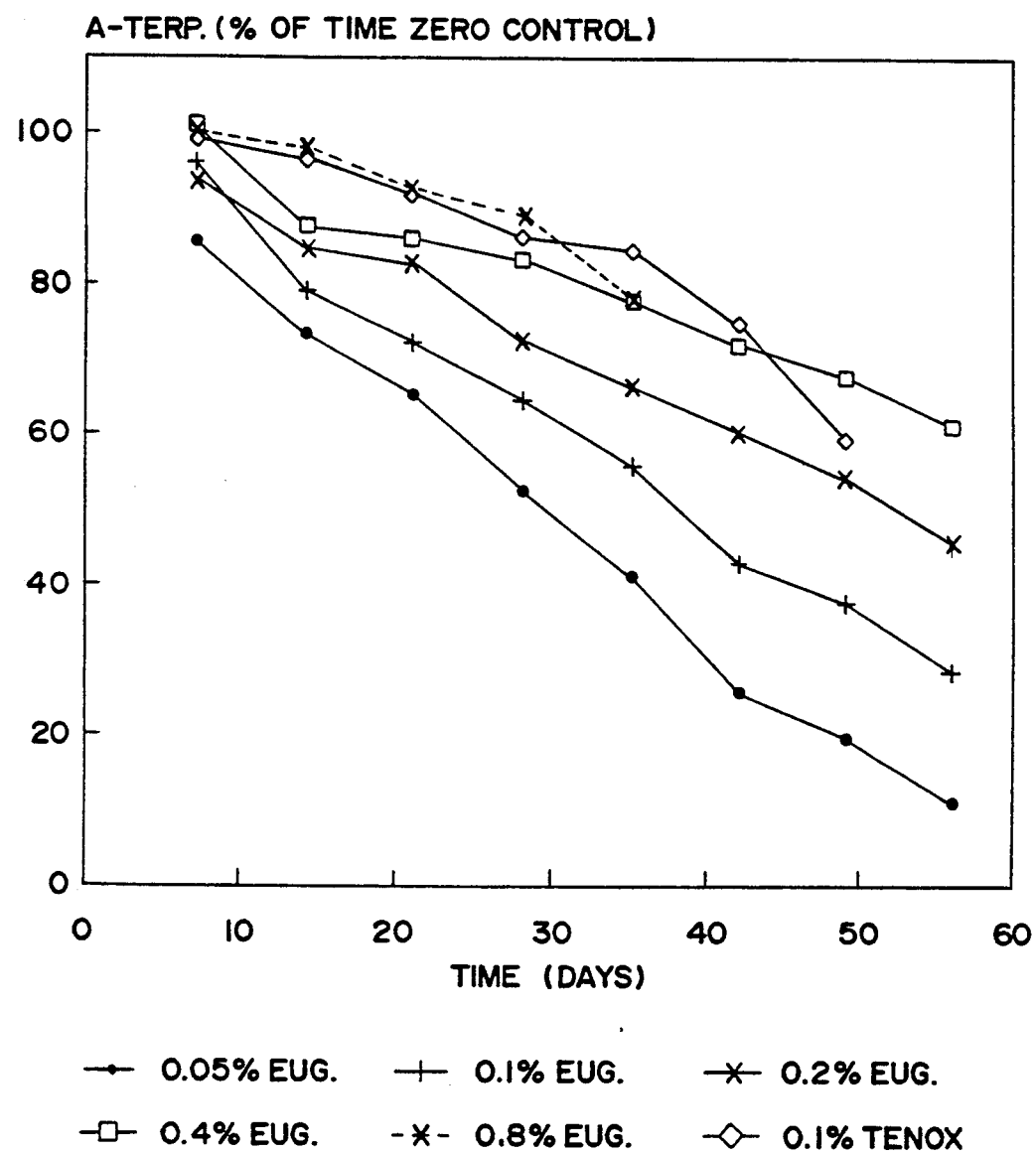
FIG. 1 shows the percent alpha-terpinene remaining as a function of time, for peppermint oil samples stabilized with various amounts of eugenol, and for a control sample stabilized with Tenox GT-2. Alpha-terpinene is an oxidizable component in mint oil.

Oxidation causes undesirable alterations of flavor of mint oil and chewing gum compositions containing mint oil. It has always been a major objective of chewing gum manufacturers to maintain the quality of the flavor and prolong the shelf life of chewing gum, including mint-flavored chewing gum. Therefore, the oxidation of mint oil, and its adverse impact on flavor, is a central concern of chewing gum manufacturers.

Mint oils, and most particularly peppermint oil, contain several key components which readily oxidize. The following Table 1 is a list of peppermint oil components and percentages, and half lives in peppermint oil, in days, at 85° F. and 100 psi oxygen.

TABLE 1

Composition Of Peppermint Oil And Half Lives of Peppermint Oil Ingredients

| Component | Percentage In Peppermint Oil* | Oxidation Half Life (Days, 85° F., 100 psi Oxygen)** |
| --- | --- | --- |
| alpha-pinene | 1.4 | 96.4 |
| beta-pinene | 1.8 | |
| sabinene | .8 | |
| myrcene | .3 | 111.0 |
| alpha-terpinene | .4 | 16.5 |
| limonene | 2.5 | 103.4 |
| 1,8-cineole | 7.3 | |
| cis-ocimene | .4 | 25.8 |
| gamma-terpinene | .4 | 19.5 |
| trans-ocimene | .1 | 25.9 |
| p-cymene | .1 | |
| terpinolene | .1 | |
| 3-octanol | .3 | 34.7 |
| 1-octene-3-ol | .1 | 115.9 |
| trans-sabinene hydrate | 1.0 | |
| menthone | 18.7 | |
| menthofuran | 3.0 | 36.3 |
| isomenthone | 2.5 | |
| linalool | .3 | |
| cis-sabinene hydrate | .1 | |
| beta-bourbonene | .5 | |
| menthyl acetate | 3.6 | |
| neomenthol | 3.1 | |
| beta-caryophyllene | .5 | 34.1 |
| neoisomenthyl acettae | .1 | |
| neoisomenthol | .4 | |
| menthol | 40.0 | |
| pulegone | .8 | |
| alpha-terpineol | .1 | |
| -germacrene D | 1.3 | 24.4 |
| piperitone | .3 | |
| viridiflorol | .2 | |

*Source: Perfumer & Flavorist, Vol. 14, November/December 1989, p. 21, article entitled "Peppermint Oil Differentiation" by Shu and Harris.
**Data taken for twelve selected components.

Other mint oils also contain many of the oxidizable components that are present in peppermint oil. For instance, spearmint oil and Scotch spearmint oil contain alpha-pinene, limonene, 3-octanol and beta pinene along with other components. Corn mint oil contains alpha-pinene, myrcene, limonene, gamma-terpinene, 3-octanol, menthofuran, beta-caryophyllene, germa-crene D, and beta-pinene along with other components. Therefore, an antioxidant which stabilizes peppermint oil will generally be useful for stabilizing other mint oils as well.

Previously synthetic antioxidants BHA, BHT and TBHQ have been primarily used for stabilizing peppermint oil and other mint-flavored oils. The common feature that renders these compounds effective as antioxidants is their phenolic-based structure, as shown below:

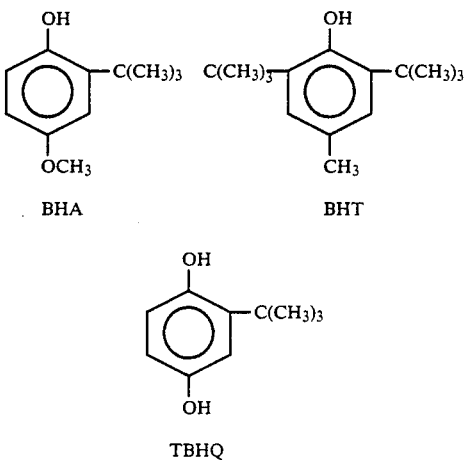

Eugenol is a natural substance found in clove oil derived from clove buds, leaves and stems. The fact that eugenol is naturally derived makes it more attractive to chewing gum manufacturers and consumers, than synthetic antioxidants. From an antioxidant standpoint, eugenol is of interest because it has a phenolic-type group similar to those found in BHA, BHT, and TBHQ:

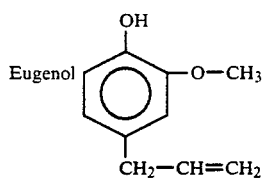

As previously stated, the present invention relates to the use of eugenol to effect improved antioxidant activity in mint oil and chewing gum which contains mint oil. The preferred amount of eugenol may vary depending on the specific mint oil and/or the specific chewing gum composition. Generally, the preferred amount of eugenol is higher when the mint oil is to be used in chewing gum. This is because some of the antioxidant may migrate from the mint oil into the gum base. However, the eugenol should not be added to mint oil or mint flavored chewing gum at levels which affect the mint flavor quality.

The following Table 2 summarizes the general, preferred and most preferred amounts of eugenol which are to be used in mint oil and mint-flavored chewing gum:

TABLE 2

Amounts Of Eugenol Which Are Effective As Antioxidant

| Range | Amount Used In Mint Oil (% by weight of mint oil) | Amount Used In Chewing Gum (% by weight of mint oil) |
| --- | --- | --- |
| General | 0.2–0.7% | Up to 3% but may vary considerably |
| Preferred | 0.3–0.5% | Up to 2% |
| Most Preferred | about 0.4% | Up to 1% |

The middle column in Table 2 indicates the amount of eugenol which is necessary to stabilize pure mint oil, such as for storage of the mint oil. The right hand column indicates that the antioxidant level may have to be increased when the mint oil is used in chewing gum, to accommodate migration of the antioxidant from the mint oil into the gum base. Preferably, the antioxidant is mixed with the mint oil before the mint oil is added to the chewing gum, in order to maximize the effectiveness of the antioxidant in stabilizing the mint oil, and to minimize the total amount of antioxidant required.

The amount of mint oil used in mint flavored chewing gums typically varies from about 0.5 to about 3.0 percent by weight of the chewing gum, more typically from about 0.7 to about 2.0 percent by weight of the chewing gum, most typically about 1.0 percent by weight of the chewing gum. The amount of eugenol required to stabilize the mint oil in the chewing gum will vary depending on the amount and type of mint oil and other chewing gum components. In other words, the antioxidant amounts in the right hand column of Table 2 can only be stated as typical, and should be optimized individually for individual chewing gums.

In general, a chewing gum composition includes a water soluble bulk portion, a water insoluble chewing gum base portion and typically water insoluble flavoring agents. The water soluble portion dissipates with a portion of the flavoring agents over a period of time during chewing. The gum base portion is retained in the mouth throughout the chewing process.

The insoluble gum base generally includes elastomers, resins, fats, oils, waxes, softeners and inorganic fillers. The elastomers may include poly-isobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; elastomers, including glycerol monostearate and glycerol triacetate; and optional ingredients such as antioxidants, colors and emulsifiers. The gum base constitutes between 5–95% by weight of the chewing gum composition, more typically 10–50% by weight of the chewing gum, and most commonly 20–30% by weight of the chewing gum.

The water soluble portion of the chewing gum may include softeners, bulk sweeteners, high intensity sweeteners and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum, and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. Typically, high intensity sweeteners are at least 20 times sweeter than sucrose. These may include but are not limited to sucralose, aspartame, salts of acesulfame, alitame, saccharin and its salts, cyclamic acid and its salts, dihydrochalcones, glycyrrhizin, thaumatin, monellin, and the like, alone or in combination. When used, high intensity sweeteners typically constitute about 0.001–5% by weight of the chewing gum, preferably about 0.01–1% by weight of the chewing gum.

Combinations of sugar and/or sugarless sweeteners may be used in chewing gum. The sweetener may also function in the chewing gum in whole or in part as a water soluble bulking agent. Additionally, the softener may also provide sweetness such as with aqueous sugar or alditol solutions.

One or more flavoring agents are generally present in the chewing gum in a total amount within the range of about 0.1–15% by weight of the chewing gum, preferably about 0.2–5% by weight of the chewing gum, most preferably about 0.5–3% by weight of the chewing gum. The flavoring agents may include essential oils, synthetic flavors or mixtures thereof including but not limited to oils derived from plants and fruits such as citrus oils, fruit essences, peppermint oil, spearmint oil, other mint oils, oil of wintergreen, anise and the like. Artificial flavoring agents and components may also be used. Natural and artificial flavoring agents may be combined in any sensorially acceptable fashion. As stated above, the present invention contemplates the use of about 0.5–3% mint oil, either alone or in combination with other flavors.

Optional ingredients such as colors, emulsifiers and pharmaceutical agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. The flavoring agent is typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1

250 grams of peppermint oil was placed in a one-pint glass jar. 0.125 grams of eugenol was added to the peppermint oil to give an active eugenol level of 0.05%. The mixture was stirred for 45 minutes. The glass jar containing the sample was placed in a Parr reaction vessel. The reaction vessel was pressurized to 100 psi using oxygen, and was placed in an 85° F. oven.

EXAMPLE 2

A second sample was prepared using the same procedure as for Example 1, except that the second sample contained 0.25 grams of eugenol, providing an active eugenol level of 0.1%. The glass jar containing the sample was placed in a Parr reaction vessel. The reaction vessel was placed under the same pressure and temperature conditions as used for Example 1.

EXAMPLE 3

A third sample was prepared using the same procedure as for Example 1, except that the third sample contained 0.50 grams of eugenol, providing an active eugenol level of 0.2%. The glass jar containing the sample was placed in a Parr reaction vessel. The reaction vessel was placed under the same pressure and temperature conditions as used for Example 1.

EXAMPLE 4

A fourth sample was prepared using the same procedure as for Example 1, except that the fourth sample contained 1.0 grams of eugenol, providing an active eugenol level of 0.4%. The glass jar containing the sample was placed in a Parr reaction vessel. The reaction vessel was placed under the same pressure and temperature conditions as used for Example 1.

EXAMPLE 5

A fifth sample was prepared using the same procedure as for Example 1, except that the fifth sample contained 2.0 grams of eugenol, providing an active eugenol level of 0.8%. The glass jar containing the sample was placed in a Parr reaction vessel. The reaction vessel was placed under the same pressure and temperature conditions as used for Example 1.

EXAMPLE 6

A sixth (control) sample was prepared using the same procedure as Example 1, except that 0.25 grams of Tenox GT-2 (tocopherol blend), was substituted in place of the eugenol, to give an active tocopherol level of 0.07%. Tenox GT-2 is a commercially available tocopherol blend containing 10.2% alpha tocopherol, 61.6 gamma tocopherol, and 28.2% delta tocopherol (based on total tocopherols) in a soybean oil diluent (70% tocopherols, 30% soybean oil). This tocopherol blend, in the above-stated concentration, performs well as a natural antioxidant for mint oil, as discussed in U.S. Pat. No. 5,139,796. The glass jar containing the sample was placed in a Parr reaction vessel. The reaction vessel was placed under the same pressure and temperature conditions as used for Example 1.

ANALYSES AND RESULTS OF EXPERIMENTS

The Parr reaction vessels used in Examples 1–6 were maintained at 100 psi oxygen and stored in the 85° F. oven for 56 days. Samples of peppermint oil were removed from each reaction vessel and analyzed at 0, 7, 14, 21, 28, 35, 42, 49 and 56 days. The samples were analyzed using gas chromatography for alpha-terpinene, gamma-terpinene, para-cymene and caryophyllene oxide. Alpha-terpinene and gamma-terpinene are oxidizable components present in peppermint oil. Para-cymene and caryophyllene oxide are oxidation products.

The results of the analyses are plotted in FIGS. 1–4. In FIG. 1, the alpha-terpinene content was plotted as a percentage of the alpha-terpinene initially present in each of the samples. As shown in FIG. 1, the samples containing 0.4% eugenol and 0.8% eugenol both exhibited antioxidant stability similar to the sample containing Tenox GT-2, evidenced by the relatively slow declines in alpha-terpinene levels for these samples. The sample containing 0.2% eugenol exhibited antioxidant stability somewhat close to the control sample. The samples containing 0.1% eugenol and 0.05% eugenol did not exhibit antioxidant stability comparable to the control.

Figure 2:
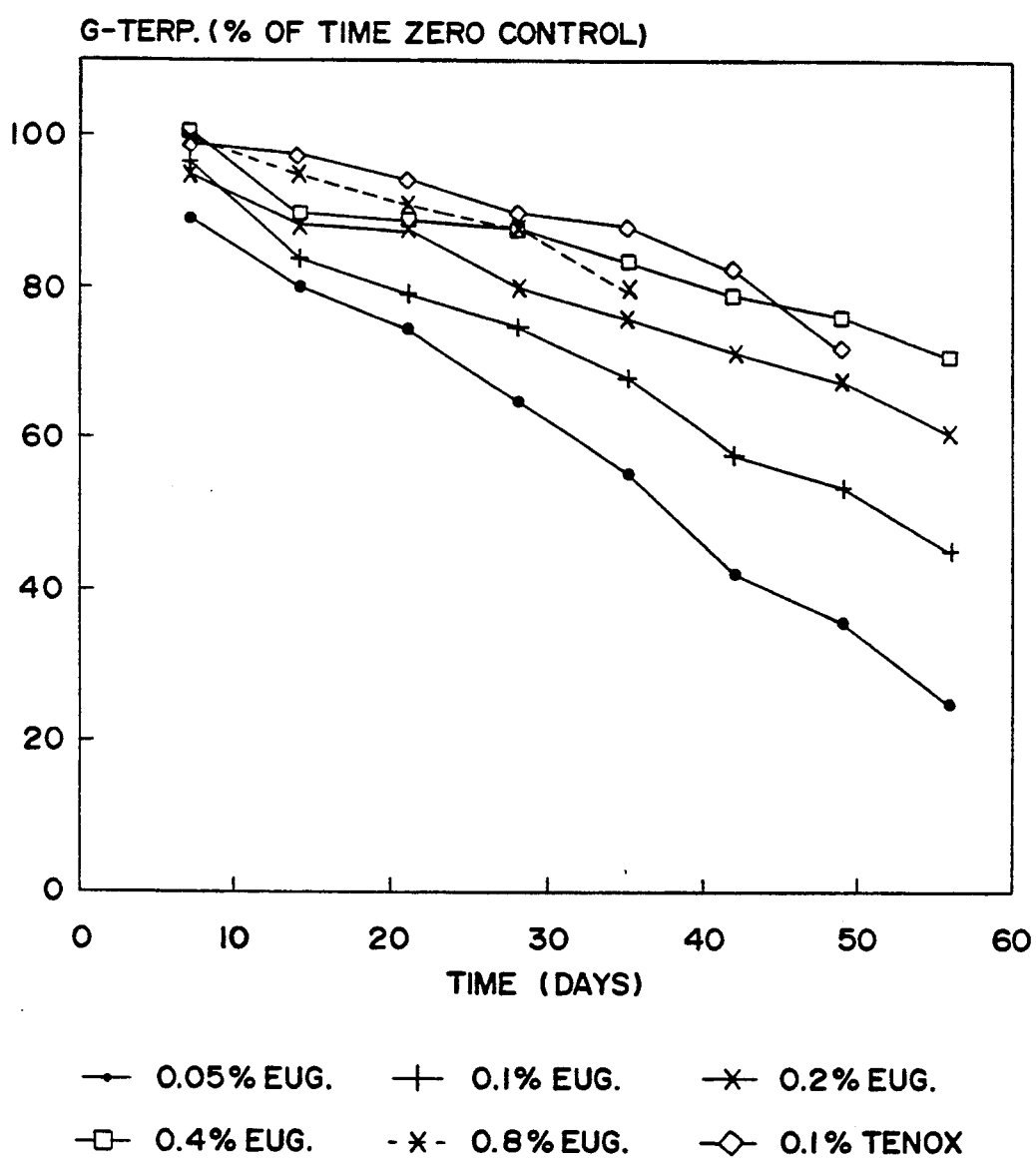
FIG. 2 shows the percent gamma-terpinene remaining as a function of time, for peppermint oil samples stabilized with various amounts of eugenol, and for a control sample stabilized with Tenox GT-2. Gamma-terpinene is also an oxidizable component in mint oil.

In FIG. 2, the gamma-terpinene content was plotted as a percentage of the gamma-terpinene initially present in each of the samples. As measured in terms of gamma-terpinene content, the samples containing 0.4% eugenol and 0.8% eugenol exhibited antioxidant stability similar to the control, evidenced by the relatively slow declines in gamma-terpinene levels for these samples. The sample containing 0.2% eugenol exhibited antioxidant stability close to the control sample. The samples containing 0.1% eugenol and 0.05% eugenol did not exhibit antioxidant stability similar to the control.

Figure 3:
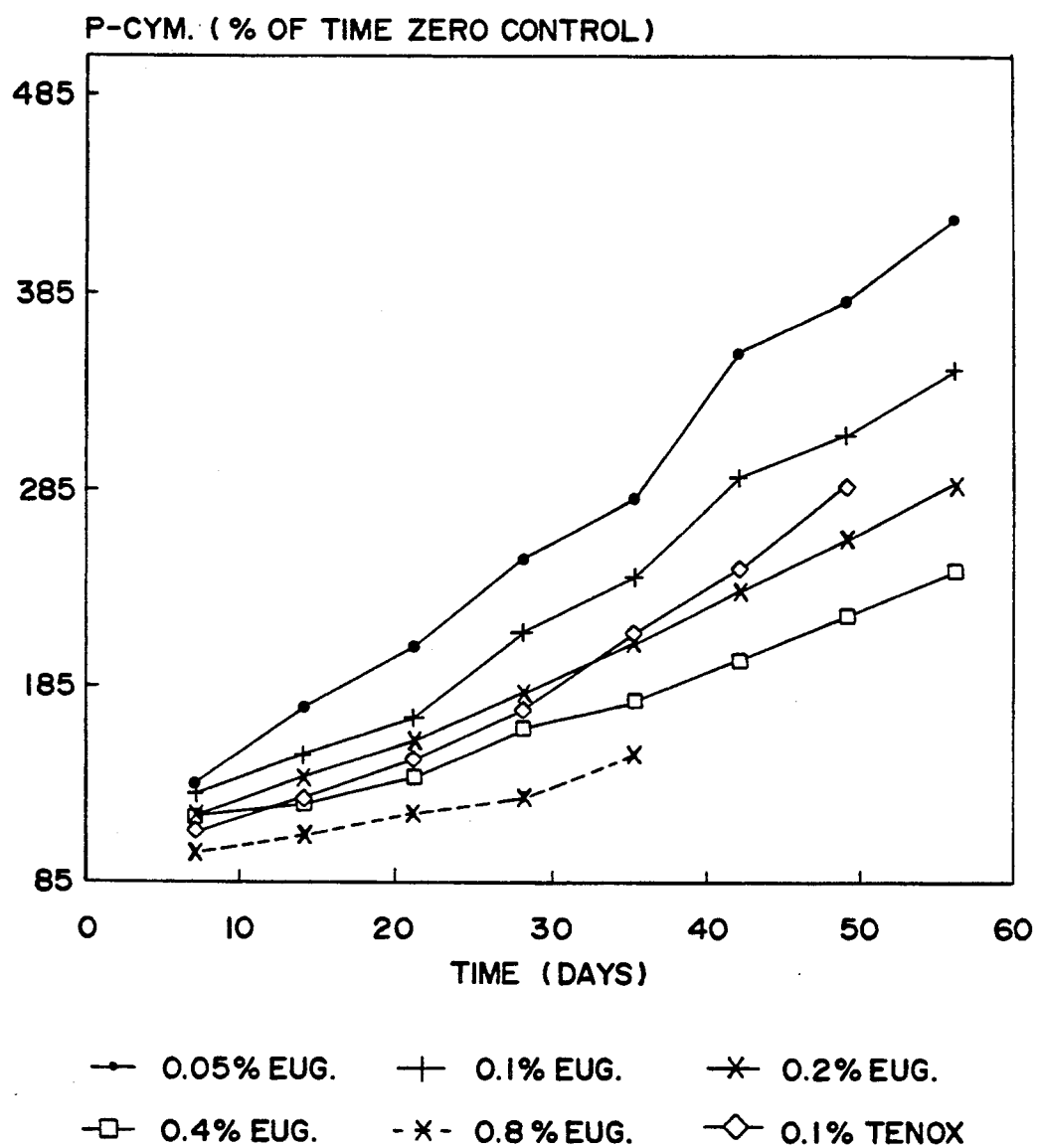
FIG. 3 shows the amount of para-cymene as a function of time, present in peppermint oil samples stabilized with various amounts of eugenol, and in a control sample stabilized with Tenox GT-2. Para-cymene is an oxidation by-product.

In FIG. 3, the para-cymene content was plotted as a percentage of the para-cymene initially present in each of the samples. As shown in FIG. 3, the sample containing 0.8% eugenol exhibited better antioxidant stability than the control by this measure, evidenced by the slower increase in para-cymene content. The samples containing 0.4% eugenol and 0.2% eugenol exhibited antioxidant stability similar to the control by this measure. The sample containing 0.1% eugenol was somewhat less stable than the control, and the sample containing 0.05% eugenol was even less stable.

Figure 4:
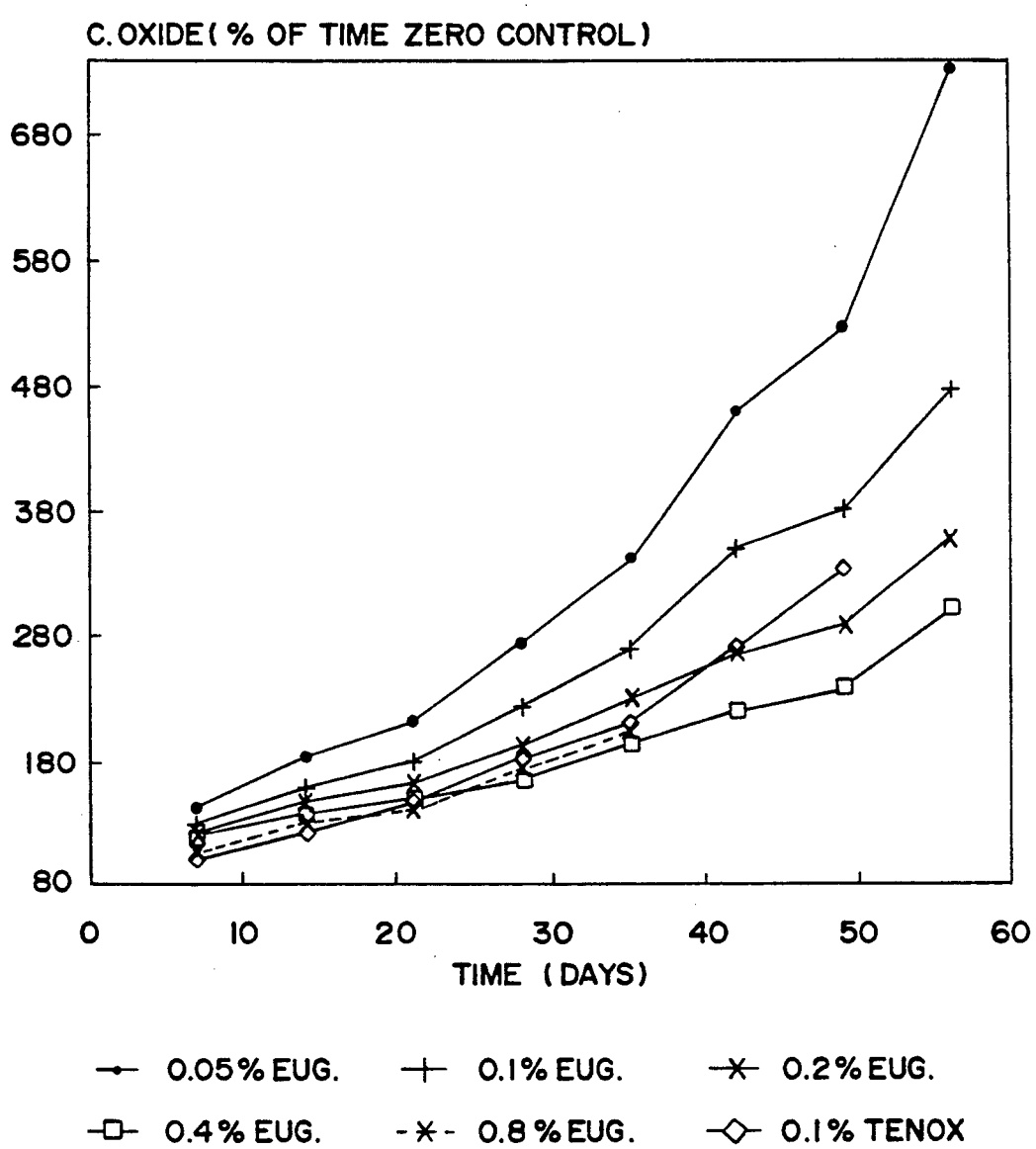
FIG. 4 shows the amount of caryophyllene oxide as a function of time, present in peppermint oil samples stabilized with various amounts of eugenol, and in a control sample stabilized with Tenox GT-2. Caryophyllene oxide is also an oxidation by-product.

In FIG. 4, the caryophyllene oxide content was plotted as a percentage of the caryophyllene oxide initially present in each of the samples. As shown in FIG. 4, the samples containing 0.8% eugenol, 0.4% eugenol and 0.2% eugenol exhibited antioxidant stability similar to the control by this measure. The sample containing 0.1% eugenol was somewhat less stable than the control, and the sample containing 0.05% eugenol was even less stable.

Overall, it was concluded that the mint oil samples containing 0.8% eugenol, 0.4% eugenol and 0.2% eugenol exhibited antioxidant stability similar to the control sample containing 0.1% Tenox GT-2. It was also concluded that the samples containing 0.4% and 0.8% eugenol were slightly more stable than the sample containing 0.2% eugenol. However, it is known that peppermint oil containing eugenol at the 0.8% level or higher will experience a change in flavor characteristics. It is desired only to stabilize the mint oil without changing its flavor characteristics. For this reason, the preferred eugenol content in mint oil is about 0.4%, with an acceptable range of about 0.2–0.7%

When the stabilized mint oil is used in chewing gum, some of the eugenol may migrate from the mint oil and into the other chewing gum components, such as the gum base, wherein any possible flavor or stabilizing effect of the eugenol may be totally or partially masked. Therefore, when the stabilized mint oil is used in chewing gum, it may be possible or even desirable to use higher amounts of eugenol in order to maintain the desired stability of the mint oil. The amount of eugenol that can be added to chewing gum without affecting the mint flavor will vary depending on the amount and type of gum base and other chewing gum ingredients.

While the embodiments of the invention disclosed herein are presently considered to be preferred, various modifications and improvements can be made without departing from the spirit and scope of the invention. The scope of the invention is indicated in the appended claims, and all changes which come within the meaning and range of equivalency of the claims are intended to be embraced therein.

We claim:

1. A stabilized mint oil composition, comprising:
   a mint oil selected from the group consisting of peppermint oil, spearmint oil, corn mint oil, Scotch spearmint oil and mixtures thereof; and
   an antioxidant stabilizer system which is substantially free of synthetic antioxidants, the stabilizer system including about 0.2% to about 0.7% eugenol by weight of the mint oil, blended into the mint oil.

2. The stabilized mint oil composition of claim 1, wherein the stabilizer system comprises about 0.3% to about 0.5% eugenol by weight of the mint oil.

3. The stabilized mint oil composition of claim 1, wherein the stabilizer system comprises about 0.4% eugenol by weight of the mint oil.

4. The stabilized mint oil composition of claim 1 in a chewing gum, in an amount of about 0.5% about 3.0% by weight of the chewing gum, wherein the mint oil comprises peppermint oil.

5. The stabilized mint oil composition of claim 1 in a chewing gum, in an amount of about 0.5% to about 3.0% by weight of the chewing gum, wherein the mint oil comprises spearmint oil.

6. The stabilized mint oil composition of claim 1 in a chewing gum, in an amount of about 0.5% to about 3.0% by weight of the chewing gum, wherein the mint oil comprises corn mint oil.

7. The stabilized mint oil composition of claim 1 in a chewing gum, in an amount of about 0.5% to about 3.0% by weight of the chewing gum, wherein the mint oil comprises Scotch spearmint oil.

8. A stabilized peppermint oil composition, which comprises peppermint oil and about 0.2% to about 0.7% weight of an antioxidant consisting essentially of eugenol.

9. The stabilized peppermint oil composition of claim 8 in a chewing gum.

10. The stabilized peppermint oil composition of claim 8, comprising about 0.3% to about 0.5% by weight of the antioxidant.

11. A stabilized spearmint oil composition, which comprises spearmint oil and about 0.2% to about 0.7% by weight of an antioxidant consisting essentially of eugenol.

12. The stabilized spearmint oil composition of claim 11 in a chewing gum.

13. The stabilized spearmint oil composition of claim 11, comprising about 0.3% to about 0.5% by weight of the antioxidant.

14. A stabilized corn mint oil composition, which comprises corn mint oil and about 0.2% to about 0.7% by weight of an antioxidant consisting essentially of eugenol.

15. The stabilized corn mint oil composition of claim 14 in a chewing gum.

16. The stabilized corn mint oil composition of claim 14, comprising about 0.3% to about 0.5% by weight of the antioxidant.

17. A stabilized Scotch spearmint oil composition, which comprises Scotch spearmint oil and about 0.2% to about 0.7% by weight of an antioxidant consisting essentially of eugenol.

18. The stabilized Scotch spearmint oil composition of claim 17 in a chewing gum.

19. The stabilized Scotch spearmint oil composition of claim 17, comprising about 0.3% to about 0.5% by weight of the antioxidant.

20. A mint flavored chewing gum composition, comprising a water soluble bulk portion, a water insoluble chewing gum base portion and a flavoring agent, the flavoring agent comprising peppermint oil and an antioxidant which includes eugenol, the chewing gum composition being substantially free of synthetic antioxidants, the eugenol being present at about 0.2–0.7% by weight of the peppermint oil.

21. A mint flavored chewing gum composition, comprising a water soluble bulk portion, a water insoluble chewing gum base portion and a flavoring agent, the flavoring agent comprising spearmint oil and an antioxidant which includes eugenol, the chewing gum composition being substantially free of synthetic antioxidants, the eugenol being present at about 0.2–0.7% by weight of the spearmint oil.

22. A mint flavored chewing gum composition, comprising a water soluble bulk portion, a water insoluble chewing gum base portion and a flavoring agent, the flavoring agent comprising corn mint oil and an antioxidant which includes eugenol, the chewing gum composition being substantially free of synthetic antioxidants, the eugenol being present at about 0.2–0.7% by weight of the corn mint oil.

23. A mint flavored chewing gum composition, comprising a water soluble bulk portion, a water insoluble chewing gum base portion and a flavoring agent, the flavoring agent comprising Scotch spearmint oil and an antioxidant which includes eugenol, the chewing gum composition being substantially free of synthetic antioxidants, the eugenol being present at about 0.2–0.7% by weight of the Scotch spearmint oil.

* * * * *